United States Patent [19]

Shimp

[11] Patent Number: 4,490,273

[45] Date of Patent: Dec. 25, 1984

[54] STABLE BLENDS OF N,N-DIGLYCIDYL AMINES AND POLYGLYCIDYL ETHERS OF POLYHYDRIC PHENOLS

[75] Inventor: David A. Shimp, Prospect, Ky.

[73] Assignee: Celanese Corporation, New York, N.Y.

[21] Appl. No.: 552,568

[22] Filed: Nov. 16, 1983

[51] Int. Cl.³ .............................................. C08G 59/28
[52] U.S. Cl. .................................. 252/182; 525/484; 528/102; 528/103; 528/406
[58] Field of Search ....................... 528/103, 102, 406; 525/484; 252/182

[56] References Cited

U.S. PATENT DOCUMENTS

| | | | |
|---|---|---|---|
| 2,884,406 | 4/1959 | Wegler et al. | 528/103 X |
| 2,897,179 | 7/1959 | Schechter et al. | 528/407 X |
| 2,951,822 | 9/1960 | Reinking | 528/103 |

*Primary Examiner*—Earl A. Nielsen
*Attorney, Agent, or Firm*—Herbert P. Price

[57] ABSTRACT

Stable polyepoxide blends are made from N,N-diglycidyl aromatic amines having alkyl substituents on one or both aromatic nucleus positions ortho to the amine group and polyglycidyl ethers of polyhydric phenols. Such blends are useful in various plastics applications when cured.

15 Claims, No Drawings

STABLE BLENDS OF N,N-DIGLYCIDYL AMINES AND POLYGLYCIDYL ETHERS OF POLYHYDRIC PHENOLS

BACKGROUND OF THE INVENTION

The field of art to which this invention pertains is curable polyepoxides derived from aromatic amines in admixture with polyglycidyl ethers or polyhydric phenols.

Polyepoxide resins are versatile compounds having a combination of chemical and physical properties that make them valuable in numerous industrial applications. They have been used in high-strength adhesives, in durable flooring compositions, for filament would structures, solventless laminating compounds and as potting and casting materials.

Most polyepoxide resins are either solids or viscous liquids at room temperature and cannot be readily blended with the other ingredients in making curable compositions. In addition, the viscous compositions have poor flow, penetration and wetting properties. The fluidity of the polyepoxide resins has been improved by heating them and thereby reducing their viscosity or by diluting them with a suitable solvent. In addition, such compounds as butyl glycidyl ether, phenyl glycidyl ether, styrene oxide, propylene oxide, 1,4-butanediol diglycidyl ether and alkylene carbonates have been used as reactive diluents for polyepoxide resins. In many cases, these procedures for the reduction of the viscosity of polyepoxide resins have proven to be unsatisfactory since they can be difficult and expensive to carry out and since they can form products which have properties which are inferior to those obtained with the undiluted polyepoxide resin.

In U.S. Pat. No. 2,951,822, the use of N,N-diglycidyl aniline with glycidyl ethers of bisphenols is described as a means for preparing compositions which are readily pourable and curable to products having high heat distortion temperature. Although not discussed in U.S. Pat. No. 2,951,822, it has been found that blends of N-N-diglycidyl aniline with glycidyl ethers of bisphenols are not stable on extended storage.

SUMMARY OF THE INVENTION

This invention pertains to stable polyepoxide blend compositions wherein one component of the blend is an N,N-diglycidyl-ortho alkyl substituted aniline and the other component is a polyglycidyl ether of a polyhydric phenol.

The composition of this invention is a stable blend of 95-5 weight percent of an N,N-diglycidyl aromatic amine and 5-95 weight percent of a polyglycidyl ether of a polyhydric phenol. The aromatic amine from which the N,N-diglycidyl aromatic amine is derived is a monoprimary aromatic amine having only one position on the aromatic nucleus ortho to the amine group substituted with an alkyl group having at least 2 carbon atoms or both positions on the aromatic nucleus ortho to the amine group substituted with alkyl groups having at least 1 carbon atom in each group. Such blends are stable with stability being defined as "no more than 3 letters viscosity change, as measured by the Gardner-Holdt method at 25° C., for blends of 40 weight percent diglycidyl amine and 60 weight percent polyglycidyl ether after 8 week aging at 120° and 140° F.".

DESCRIPTION OF THE INVENTION

The diglycidyl amines used in this invention are made by reacting a hindered monoprimary aromatic amine with an epihalohydrin. Hindered monoprimary aromatic amines are those which contain alkyl substituents on the aromatic nucleus ortho to the primary amine group. In order to be useful in this invention, the alkyl substituents must contain a total of at least two carbon atoms. If the amine has only one alkyl group, then this group must be at least ethyl. If the amine has two substituents, then each amine group can be methyl. In each case, i.e., one alkyl substituent or two, the maximum number of carbon atoms in each alkyl group is four. Examples of such amines are 2-ethylaniline, 2-isopropylaniline, 2-n-butylaniline, 2,6-dimethylaniline, 2-methyl, 6-ethylaniline, 2,6-diethylaniline, 2-methyl, 6-isopropylaniline, 2-methyl, 6-isobutylaniline and the like.

The diglycidyl amines useful in this invention are prepared by reacting the amine in a molar excess of an epihalohydrin followed by dehydrohalogenation with caustic. Useful epihalohydrins are epichlorohydrin, epibromohydrin and epiiodohydrin with epichlorohydrin being preferred. A method for preparing glycidyl amines is described in U.S. Pat. No. 2,951,822 which is hereby incorporated by reference. These diglycidyl amines have two glycidyl groups attached to the amine nitrogen atom, said glycidyl groups having replaced the two active amine hydrogen atoms. The epoxide equivalent weight of these glycidyl amines can be the theoretical equivalent weight when the glycidyl amines have been highly purified. However, generally the epoxide equivalent weight will be about 105 to about 130% of theoretical. For instance, the theoretical epoxide equivalent weight of N,N-diglycidyl-2-methyl,6-ethylaniline is 123.5. However, the industrial grade product has an epoxide equivalent weight of 135 to 145. The viscosity of the glycidyl amines ranges from about 30 to 1,000 cps at 25° C.

The polyepoxide resins useful in this invention are polyglycidyl ethers of polyhydric phenols obtained by reacting a polyhydric phenol with an epihalohydrin and caustic or by reacting a low molecular weight polyglycidyl ether with a dihydric phenol. Polyhydric phenols from which these polyepoxide resins are derived include 2,2-bis(4-hydroxyphenol)propane or Bisphenol A as it is commonly called, resorcinol, hydroquinone, 1,5-dihydroxynaphthalene, 4,4'-dihydroxybenzophenone, bis(4-hydroxyphenyl), bis(4-hydroxyphenyl)methane, bis(4-hydroxyphenyl)ethane, novolak resins containing more than 2 phenol or cresol moieties linked through methylene bridges, and the like.

Additional polyhydric phenols are those listed above which have been halogenated in the nucleus. Examples of such halogenated polyhydric phenols are bis(3-chloro-4-hydroxyphenyl)methane, 2,2-bis(3-bromo-4-hydroxyphenyl)propane, 2,2-bis(3-iodo-4-hydroxyphenyl)ethane, 2,2-bis(3,5-dibromo-4-hydroxyphenyl)propane and the like. A preferred halogenated polyhydric phenol is 2,2-bis(3,5-dibromo-4-hydroxyphenyl) propane or tetrabromo Bisphenol A as it is commonly called.

The polyglycidyl ethers of polyhydric phenols useful in this invention can be liquid or solids and have viscosities as low as 1,000 cps and melting points as high as 130° C. Epoxide equivalent weights will vary from about 110 to about 2,000. Such polyglycidyl ethers can be prepared by the processes described in U.S. Pat. Nos. 2,716,099; 2,801,227; 2,615,007; 2,615,008 and 3,477,990 which are hereby incorporated by reference.

In preparing the compositions of this invention, the glycidyl amine is simply blended with the polyglycidyl ether using heat, if necessary, to obtain a homogeneous blend. The amounts used can vary from about 5 to about 95 weight percent glycidyl amine to 95 to 5 weight percent polyglycidyl ether, the total being 100 weight percent of the two components. The particular percentages of the two components that are used will vary depending upon the desired viscosity of the blend, the particular glycidyl amine that is used, the particular polyglycidyl ether that is used, and the desired properties of the cured composition obtained from the blend.

The compositions of this invention are stable on extended storage with stability being defined as "no more than 3 letters viscosity change as measured by the Gardner-Holdt method at 25° C. of blends of 40 weight percent diglycidyl amine and 60 weight percent polyglycidyl ether, after 8 weeks aging at 120° F. and 140° F.". Such compositions exhibit very little change in viscosity after being stored under hot summer conditions.

In addition to storage stability, the compositions of this invention have viscosities as low as 100 cps. When combined with curing agents, the pot life is longer than that of the unmodified polyglycidyl ether. The cured compositions have high physical strength properties, low water absorption and high heat distortion temperatures.

The compositions of this invention can be converted to cured thermoset resins using any of the well-known epoxy resin curing agents. These curing agents include primary, secondary and tertiary amines, imidazoles, polyphenols, Friedel-Crafts catalysts, and organic polycarboxylic acids and their anhydrides.

If desired, other ingredients can be added to the novel compositions before they are cured. Such ingredients include fibrous reinforcements, fillers, pigments, dyes, plasticizers and the like in the amounts ordinarily employed for such purposes. Combinations of the compositions of this invention with other resins, such as urea-formaldehyde resins, melamine-formaldehyde resins and phenolic resins can be readily cured to form useful products.

The compositions of this invention in combination with epoxide resin curing agents can be cured at room temperature or by heating them at a suitable temperature. The curing temperatures can be varied between room temperature up to 200° C. or higher. The desirable curing temperature will depend, of course, upon the compositions being used, such temperatures being readily determined by those skilled in the art.

The compositions of this invention are useful in filament wound structures, solvent-free laminating compounds, high solids coatings, aircraft tools, floor toppings and the like.

The invention is illustrated by the following examples. Parts and percentages unless otherwise indicated are parts and percentages by weight.

EXAMPLE 1

To a suitable reactor were added 217.8 parts of 2-ethylaniline and 1998 parts of epichlorohydrin. Heat was applied raising the temperature to reflux - 122° C. Heating was continued for 12 hours with the temperature rising to 126° C. The non-volatile content of the reactants was determined to be 22.58% by heating a thin film of the reactants at 100° C. for 30 minutes.

The reactor was fitted with a take-off condenser for removing water and returning epichlorohydrin to the reactor. Aqueous sodium hydroxide, 288 parts of 50% aqueous, was slowly added while keeping the temperature at 100° C. and removing the water. All of the aqueous sodium hydroxide was added over 2 hours and 10 minutes. After holding at 100° C. for an additional 5 minutes, the reactor contents were cooled to room temperature.

The reactor was set up for vacuum distillation. Heat was applied and at 97° C., vacuum was slowly applied. After 1 hour and 18 minutes at 95°-97° C., full vacuum (0.5 inches Hg absolute pressure) was reached. After 16 minutes at full vacuum, the temperature reached 110° C. The temperature was held at 110° C. for 10 minutes, after which time the vacuum was released with nitrogen. Methylisobutyl ketone, 470 parts, and water, 828 parts, were added followed by 10 minutes of agitation. The organic layer and the aqueous layer were allowed to separate and the aqueous layer was drawn off.

With the temperature at 54° C., 63 parts of 50% aqueous sodium hydroxide and 414 parts of water were added. The temperature was raised to 80° C. and was held at 80° C. for one hour and 30 minutes. The organic and aqueous layers were allowed to separate and the aqueous layer was drained off. Additional water, 414 parts, plus a few drops sulfuric acid, 30%, were added to adjust pH to 7. After stirring for 10 minutes, the neutral aqueous layer was drawn off.

The reactor was then equipped for azeotropic distillation to remove the water dissolved in the organic layer. After the water was removed, the organic solution was filtered. The organic solvent was then removed by vacuum distillation.

The yield of product, N,N-diglycidyl-2-ethylaniline, was 400 parts. The non-volatile (N.V.) portion of the product was 97.0% after heating a thin film for 30 minutes at 100° C., the epoxide equivalent weight was 134, the hydrolyzable chlorine 0.18%, Brookfield viscosity at 25° C. was 78 cps, Gardner-Holdt viscosity at 25° C. was A₁, and the Gardner Color was 12.

EXAMPLE 2

Using the same procedure as described in Example 1, diglycidyl amines were prepared from 2,6-dimethylaniline, 2-methyl-6-ethylaniline, 2,6-diethylaniline, 2,6-diisopropylaniline and 2-isopropylaniline.

Diglycidylaniline and diglycidyl-2-methylaniline are commercially available as Glyamine 125 and Glyamine 135 respectively from FIC Resins Division.

The properties of these diglycidyl amines are listed in Table I.

TABLE I

| Physical Properties of N,N—Diglycidyl Amines | | | | | |
|---|---|---|---|---|---|
| Diglycidyl Amine Of | Epoxide Eq. Wt. | 25° C. Viscosity cps | Hyd. Cl % | Color Gardner | % Solids |
| 2,6-dimethylaniline | 117 | 60 | 0.03 | 7 | 97.6 |
| 2,methyl,6-ethylaniline | 124 | 63 | 0.44 | 9 | 98.1 |
| 2,6-diethylaniline | 131 | 84 | 1.0 | 8 | 98.1 |
| 2,6-diisopropylaniline | 145 | 650 | 0.84 | 13 | 99.1 |
| aniline | 128 | 360 | 0.09 | 6 | 99.5 |
| 2-methylaniline | 140 | 93 | 0.09 | 3 | 97.8 |
| 2-isopropylaniline | 144 | 65 | 0.63 | 10 | 98.4 |

EXAMPLE 3

The digylcidyl amines described in the preceding examples were blended with the diglycidyl ether of Bisphenol A having an epoxide equivalent weight of 190 and a Gardner-Holdt viscosity at 25° C. of $Z_5$-$Z_6$. The blends were made with 60 parts of diglycidyl ether and 40 parts diglycidyl amine. The Gardner-Holdt viscosity, measured at 25° C., of the blends was determined initially. The blends were then stored at 49° C. (120° F.) and 60° C. (140° F.). The Gardner-Holdt viscosities, measured at 25° C., were determined after 1 week, 2 weeks, 4 weeks, and 8 weeks.

These viscosities are shown in Table II.

diamine—(CA), were poured into molds and were cured by heating at 93° C. until gelled followed by 2 hours at 204° C. The properties of the blends and cured castings are listed in Table III.

TABLE III

| | Cured Properties of Blends of Diglycidyl Amines and Diglycidyl Ethers with Aromatic Amines | | | | | | | | |
|---|---|---|---|---|---|---|---|---|---|
| | A | B | C | D | E | F | G | H | I |
| COMPOSITION: | | | | | | | | | |
| DGE | 100 | 75 | 60 | 40 | — | 75 | 60 | 40 | — |
| 2,6DM | — | 25 | 40 | 60 | 100 | — | — | — | — |
| 2M6E | — | — | — | — | — | 25 | 40 | 60 | 100 |
| CA | 22.5 | 25.4 | 27.0 | 29.1 | 33.3 | 24.5 | 25.8 | 27.3 | 30.2 |
| HANDLING PROPERTIES: | | | | | | | | | |
| Init. Viscosity (cps) | 10,500 | 2,330 | 1,230 | 350 | 120 | 2,250 | 1.050 | 420 | 112 |
| Min. to Gel @ 93° C. | 37 | 50 | 65 | 115 | 270 | 60 | 70 | 120 | 300 |
| CURED STATE PROPERTIES: | | | | | | | | | |
| HDT (°C.) | | | | | | | | | |
| Dry | 152 | 138 | 133 | 137 | 134 | 138 | 131 | 129 | 119 |
| Wet[a] | 123 | 123 | 119 | 118 | 120 | 118 | 115 | 114 | 115 |
| % Water Ab.[a] | 1.95 | 1.86 | 1.66 | 1.45 | 1.32 | 1.88 | 1.77 | 1.49 | 1.37 |
| Tensile | | | | | | | | | |
| Strength (psi) | 12,000 | 13,100 | 13,200 | 12,000 | 6,000 | 14,100 | 13,500 | 8,800 | Brittle |
| Strain (%) | 6.5 | 4.6 | 4.1 | 3.2 | 1.1 | 4.4 | 3.9 | 2.0 | |
| Modulus ($10^6$ psi) | 0.49 | 0.46 | 0.48 | 0.47 | 0.52 | 0.51 | 0.47 | 0.50 | |
| Flexure | | | | | | | | | |
| Strength (psi) | 19,800 | 17,200 | 17,700 | 18,600 | 10,500 | 21,000 | 20,400 | 21,500 | 7,800 |
| Strain (%) | 6.6 | 4.6 | 4.2 | 4.2 | 1.8 | 5.0 | 4.9 | 4.6 | 1.4 |
| Modulus ($10^6$ psi) | 0.48 | 0.45 | 0.47 | 0.50 | 0.56 | 0.47 | 0.50 | 0.53 | 0.58 |

[a] Conditioned 64 hours at 93° C. & >95% Relative Humidity.

TABLE II

| Viscosity Stability of Blends of Diglycidyl Amines and Diglycidyl Ethers | | | | | |
|---|---|---|---|---|---|
| Amine Precursor of Diglycidylamine Component | Initial Viscosity | 1 Week | 2 Weeks | 4 Weeks | 8 Weeks |
| | | 120° F. Storage | | | |
| Aniline | X-Y | Y | Y | Y-Z | $Z_2$-$Z_3$ |
| 2-methylaniline | U-V | V | V | W | X-Y |
| 2,6-dimethylaniline | T-U | T-U | T-U | T-U | U-V |
| 2-methyl,6-ethylaniline | T-U | T-U | T-U | T-U | U-V |
| 2,6-diethylaniline | T-U | T-U | T-U | T-U | V |
| 2,6-diisopropylaniline | Z-$Z_1$ | $Z_1$ | $Z_1$ | $Z_1$ | $Z_2$ |
| 2-ethylaniline | O | P | P | P | Q |
| 2-isopropylaniline | U-V | V | V | V | V-W |
| | | 140° F. Storage | | | |
| Aniline | X-Y | Y | Y | $Z_1$ | $Z_3$-$Z_4$ |
| 2-methylaniline | U-V | V | V-W | W | X-Y |
| 2,6-dimethylaniline | T-U | T-U | T-U | T-U | V |
| 2-methyl,6-ethylaniline | T-U | T-U | T-U | U | U-V |
| 2,6-diethylaniline | T-U | T-U | T-U | T-U | V-W |
| 2,6-diisopropylaniline | Z-$Z_1$ | $Z_1$ | $Z_1$ | $Z_1$ | $Z_2$-$Z_3$ |
| 2-ethylaniline | O | P | P | P | Q-R |
| 2-isopropylaniline | U-V | V | V | V | V-W |

EXAMPLE 4

The diglycidyl amines, N,N-diglycidyl-2,6-dimethylaniline (2,6DM) and N,N-diglycidyl-2-methyl,6-ethylaniline (2M6E), were blended with the diglycidyl ether of Bisphenol A (DGE) described in Example 3. The blends were mixed with an aromatic amine curing agent—60% methylene dianiline and 40% m-phenylene

EXAMPLE 5

The diglycidyl ether of tetrabromo Bisphenol A, 37.5 parts, having a solid form and an epoxide equivalent weight of 370, was blended with 16.07 parts of diglycidyl 2-methyl,6-ethylaniline, having a viscosity of 77 cps at 25° C. and an epoxide equivalent weight of 138, at 93° C. to form a miscible solution. When cooled to 25° C., the blend which contained 70% brominated epoxy resin and 30% diglycidylamine, remained a clear liquid and exhibited a Gardner-Holdt viscosity of $Z_5$-$Z_6$ at 25° C.

A portion of the above described blend, designated as Blend 5-A, was stored in an oven at 49° C. for a total of 98 days. At the completion of this storage period, the blend was unchanged in appearance and exhibited a Gardner-Holdt viscosity of $Z_6$-$Z_7$ at 25° C.

Additional blends were prepared from the diglycidyl ether of tetrabromo Bisphenol A and diglycidyl 2-methyl,6-ethylaniline by heating and stirring until clear solutions were obtained. Blend 5-B contained 70% brominated epoxy resin and had a viscosity of 29,500 cps at 25° C. Blend 5-C contained 65% brominated epoxy resin and had a viscosity of 11,400 cps. Blend 5-D contained 64% brominated epoxy resin and had a viscosity of 8,800 cps.

Blend 5-E was prepared as described above from 64% diglycidyl ether of tetrabromo Bisphenol A and 36% diglycidyl 2,6-dimethylaniline having an epoxide equivalent weight of 129 and a viscosity of 60 cps at 25° C. The blend was a clear liquid having a viscosity of 10,000 cps at 25° C.

All of the above blends remained clear liquids free from crystal formation when stored at room temperature.

Other blends were prepared with the diglycidyl ether of tetrabromo Bisphenol A and conventional reactive diluents. Blend 5-F contained 15% butyl glycidyl ether and had an initial viscosity at 25° C. of 11,200 cps. Crystals of brominated epoxy resin precipitated from this blend within 10 days storage at room temperature. Another blend, 5-G, contained 30% diglycidyl ether of 1,4-butanediol and had an initial viscosity of 3,200 cps at 25° C. The blend crystallized to a solid mass within 2 days at room temperature.

EXAMPLE 6

Castings were prepared by dissolving stoichiometric amounts of aromatic amine curing agents into epoxy resins by stirring and heating at temperatures in the range of 65° C. to 80° C., deairing under vacuum to remove dissolved and entrained gases and pouring the warm resins into preheated aluminum molds. The castings, ⅛ inch thick, were gelled at temperatures of 93°–121° C. and were cured by further heating at 177° C. for 2 hours. Properties of the cured castings are listed in Table IV.

TABLE IV

| Cured Casting Properties | | | | |
|---|---|---|---|---|
| | 6-A | 6-B | 6-C | 6-D |
| COMPOSITION, PARTS | | | | |
| Blend 5-B | 204 | 190 | — | — |
| Brominated Epoxy Resin[1] | — | — | — | 215 |
| Nonbrominated Epoxy Resin[2] | — | — | 100 | — |
| Curing Agent A[3] | 29.2 | — | 23.5 | — |
| Curing Agent B[4] | — | 32.6 | — | 29.9 |
| PROPERTIES OF CURED CASTINGS | | | | |
| Flexure Strength (psi) | 22,900 | 19,600 | 16,600 | 22,100 |
| Flexural Strain (%) | 4.7 | 3.4 | 5.3 | 8.4 |
| Flexural Modulus ($10^6$ psi) | 0.57 | 0.55 | 0.40 | 0.47 |
| Distortion Temp. °C. | | | | |
| Dry | 138 | 120 | 150 | 177 |
| Wet[5] | 129 | 115 | 117 | 160 |
| % Water Absorption[5] | 0.66 | 0.65 | 2.10 | 0.55 |
| Chemical Immersion - % Wt. Change After 28 Days @ 93° C. In | | | | |
| 10% Acetic Acid (Aqueous) | +1.3 | +1.3 | +2.1 | +0.9 |
| 10% Sulfuric Acid (Aqueous) | +1.4 | +1.1 | +1.8 | +0.8 |
| 5% Na Hypochlorite (Aqueous) | −2.3 | −2.6 | −5.8 | −0.2 |
| Flame Retardancy UL-94 | V-O | V-O | Burns | V-O |

TABLE IV-continued

| Cured Casting Properties | | | | |
|---|---|---|---|---|
| | 6-A | 6-B | 6-C | 6-D |
| Method | | | | |

[1] Diglycidyl ether of tetrabromo Bisphenol A - epoxide equivalent weight of 370.
[2] Diglycidyl ether of Bisphenol A - epoxide equivalent weight of 185.
[3] Aromatic Amine - 60% methylene dianiline, 40% m-phenylene diamine.
[4] Aniline-formaldehyde condensate - 2.3 primary amine groups per molecule.
[5] Specimens conditioned 64 hrs. at 93° C. and >95% relative humidity.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A stable blend of (A) 95 to 5 weight percent of an N,N-diglycidyl aromatic amine and (B) 5 to 95 weight percent of a polyglycidyl ether of a polyhydric phenol, wherein the aromatic amine is a monoprimary aromatic amine having only one position on the aromatic nucleus ortho to the amine group substituted with an alkyl group having at least 2 carbon atoms or both positions on the aromatic nucleus ortho to the amine group substituted with alkyl groups having at least one carbon atom in each group.

2. The blend of claim 1 wherein the monoprimary aromatic amine is 2-ethylaniline.

3. The blend of claim 1 wherein the monoprimary aromatic amine is 2,6-dimethylaniline.

4. The blend of claim 1 wherein the monoprimary aromatic amine is 2-methyl,6-ethylaniline.

5. The blend of claim 1 wherein the polyglycidyl ether of a polyhydric phenol is the diglycidyl ether of 2,2-bis(4-hydroxyphenyl) propane.

6. The blend of claim 1 wherein the polyglycidyl ether of a polyhydric phenol is the diglycidyl ether of 2,2-bis(3,5-dibromo,4-hydroxyphenyl)propane.

7. A stable blend of (A) 60 to 25 weight percent of an N,N-diglycidyl aromatic amine and (B) 40 to 75 weight percent diglycidyl ether of 2,2-bis(4-hydroxyphenyl)-propane, wherein the aromatic amine is a monoprimary aromatic amine having only one position on the aromatic nucleus ortho to the amine group substituted with an alkyl group having two or four carbon atoms.

8. The blend of claim 7 wherein the monoprimary aromatic amine is 2-ethylaniline.

9. The blend of claim 7 wherein the monoprimary aromatic amine is 2-isopropylaniline.

10. A stable blend of (A) 60 to 25 weight percent of an N,N-diglycidyl aromatic amine and (B) 40 to 75 weight percent diglycidyl ether of 2,2-bis(4-hydroxyphenyl)-propane, wherein the aromatic amine is a monoprimary aromatic amine having both positions on the aromatic nucleus ortho to the amine group substituted with alkyl groups having at least one carbon atom in each group.

11. The blend of claim 10 wherein the monoprimary aromatic amine is 2,6-dimethylaniline.

12. The blend of claim 10 wherein the monoprimary aromatic amine is 2-methyl,6ethylaniline.

13. A stable blend of (A) 60 to 25 weight percent of an N,N-diglycidyl aromatic amine and (B) 40 to 75 weight percent diglycidyl ether of 2,2-bis(3,5-dibromo-4-hydroxyphenyl)propane, wherein the aromatic amine is a monoprimary aromatic amine having both positions on the aromatic nucleus ortho to the amine group substituted with alkyl groups being at least one carbon atom in each group.

14. The blend of claim 13 wherein the monoprimary aromatic amine is 2,6-dimethylaniline.

15. The blend of claim 13 wherein the monoprimary aromatic amine is 2-methyl,6-ethylaniline.

* * * * *